US010394411B1

(12) United States Patent
Caballero

(10) Patent No.: US 10,394,411 B1
(45) Date of Patent: *Aug. 27, 2019

(54) DYNAMIC RESOURCE MANAGEMENT FOR CLOUD-BASED SERVICES

(71) Applicant: Amazon Technologies, Inc., Seattle, WA (US)

(72) Inventor: Manuel Dominic Caballero, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 288 days.

This patent is subject to a terminal disclaimer.

(21) Appl. No.: 15/483,106

(22) Filed: Apr. 10, 2017

Related U.S. Application Data

(63) Continuation of application No. 14/250,856, filed on Apr. 11, 2014, now Pat. No. 9,652,129.

(51) Int. Cl.
*G06F 3/00* (2006.01)
*G06F 3/0481* (2013.01)
*H04L 29/06* (2006.01)

(52) U.S. Cl.
CPC .......... *G06F 3/0481* (2013.01); *H04L 65/60* (2013.01); *H04L 67/42* (2013.01)

(58) Field of Classification Search
None
See application file for complete search history.

(56) References Cited

U.S. PATENT DOCUMENTS

| 8,799,968 B2* | 8/2014 | Ho | H04N 21/2387 725/115 |
| 2008/0205389 A1* | 8/2008 | Fang | H04L 65/80 370/389 |
| 2012/0167151 A1* | 6/2012 | Cho | H04N 21/47202 725/93 |
| 2013/0024532 A1* | 1/2013 | Lee | G06Q 50/01 709/206 |
| 2016/0059125 A1* | 3/2016 | Georgiev | A63F 13/216 463/31 |

OTHER PUBLICATIONS

U.S. Office Action dated Dec. 9, 2015 issued in U.S. Appl. No. 14/250,856.
U.S. Final Office Action dated May 10, 2016 issued in U.S. Appl. No. 14/250,856.
U.S. Office Action dated Aug. 12, 2016 issued in U.S. Appl. No. 14/250,856.
U.S. Notice of Allowance dated Jan. 23, 2017 issued in U.S. Appl. No. 14/250,856.
U.S. Appl. No. 14/250,856, filed Apr. 11, 2014, Caballero.

* cited by examiner

*Primary Examiner* — Thanh T Vu
(74) *Attorney, Agent, or Firm* — Weaver Austin Villeneuve & Sampson LLP

(57) ABSTRACT

Techniques are described for optimizing the use of computing resources in connection with providing online services. A user interface (UI) executes in the cloud and is streamed as video to a client device. When the user navigates away from the UI, the connection between the client and the computing resource is terminated and the resource is placed back in the pool. The most recent state of the UI is retained so that when the user navigates back to the UI, a new resource is allocated and the UI begins executing at or near the point where the user last interacted with the UI.

20 Claims, 2 Drawing Sheets

# DYNAMIC RESOURCE MANAGEMENT FOR CLOUD-BASED SERVICES

CROSS REFERENCE TO RELATED APPLICATIONS

This application is a continuation of, and claims priority under 35 U.S.C 120 to, U.S. patent application Ser. No. 14/250,856, filed Apr. 11, 2014, titled "DYNAMIC RESOURCE MANAGEMENT FOR CLOUD-BASED SERVICES," which is hereby incorporated herein by reference in its entirety.

BACKGROUND

Increasingly, providers of online services are delivering their services to customers using on-demand, cloud-based computing resources. Service providers typically pay the provider of a cloud-computing platform for the use of these computing resources (e.g., by the hour). This overhead often determines whether an online service is economically viable. This is particularly the case for markets characterized by very thin profit margins such as, for example, the delivery of online content.

DETAILED DESCRIPTION

The present disclosure describes techniques for optimizing the use of cloud-based computing resources in connection with providing online services. According to a particular class of implementations, a user interface (UI) is provided in connection with a content delivery service with which end users may discover and select content (e.g., video, audio, etc.) for consumption. The UI executes in the cloud and is streamed as video to the user's client device where a thin client application is responsible for rendering the video and capturing user input for transmission back to the UI operating in the cloud. When the user navigates away from the UI, e.g., to watch a selected movie, the connection between the thin-client and the remote computing resource on which the UI is executing is terminated and the resource is placed back in a resource pool. The most recent state of the UI is retained so that when the user navigates back to the UI, e.g., by pausing the movie, a new computing resource is allocated and the UI begins executing at or near the point where the user last interacted with the UI. This dynamic allocation of computing resources is largely transparent to the user and avoids consuming resources when the user is not interacting with the UI.

Figure 1:
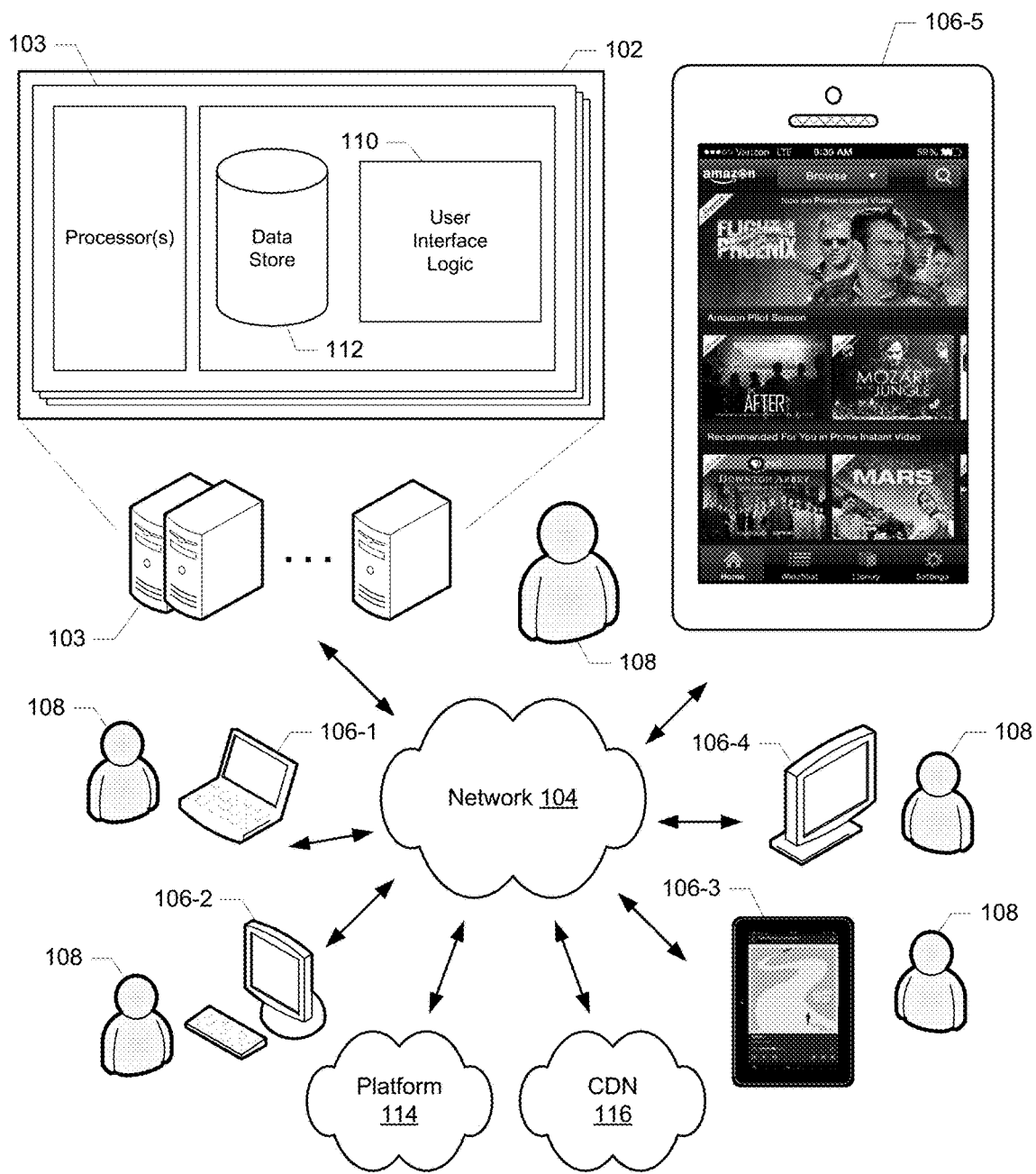
FIG. 1 illustrates an example of a computing environment in which computing resources may be dynamically allocated as described herein.

FIG. 1 illustrates an example of a computing environment in which computing resources may be dynamically allocated as described herein in conjunction with the use of a content service 102 via network 104 by a variety of client devices (106-1 through 106-5) associated with users 108. Content service 102 may conform to any of a wide variety of architectures such as, for example, a services platform deployed at one or more co-locations, each implemented with one or more servers 103. Network 104 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 106 may be any suitable device capable of connecting to network 104 and consuming content provided by service 102. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 102. Alternatively, such resources may be independent of content service 102, e.g., on a platform under control of a separate provider of computing resources with which content service 102 connects to consume computing resources as needed.

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

In the following example and for the sake of simplicity, content service 102 is described as if it were integrated with the platform dynamically allocating computing resources. However, as discussed above, such a platform may also be independent of content service 102 (e.g., computing platform 114) without departing from the scope of the invention. Content service 102 may also be integrated with the platform(s) that stores and streams the content to client devices. Alternatively, content service 102 may provide access to content in conjunction with one or more content delivery networks (e.g., CDN 116) that may or may not be independent of content service 102. Other variations are contemplated to be within the scope of the invention.

Content service 102 may include UI logic 110 that facilitates the provision of UIs with which users may search for and download or connect with various types of content. Content service 102 also includes a data store 112 in which the states of UIs for particular client devices may be stored in connection with the dynamic allocation of computing resources as described herein. Content service 102 may also include user account information (e.g., in data store 112) as well as business logic (not shown) that governs the operation of the content service and management of user accounts. According to some implementations, data store 112 may also include content (e.g., video content, audio content, online gaming, etc.) to which the UIs provide access. Alternatively, content may be provided and/or hosted by one or more separate platforms, e.g., CDN 116. It should be noted that, while UI logic 110 and data store 112 are contemplated as integrated with a content service, implementations are contemplated in which either or both operate remotely from the associated content service, and/or either or both are under the control of an independent entity. Implementations are also contemplated in which some or all of the functionality of UI logic 110 and/or at least some of the content to which the UI provides access are/is implemented and/or stored on client device (e.g., device 106-5).

A specific implementation will now be described with reference to the computing environment of FIG. 1 and the flow diagram of FIG. 2. The depicted example illustrates an implementation in the context of a content service in which a UI is provided that allows a user to discover and select content (e.g., video content, audio content, online gaming, etc.) for playback on a client device. However, the scope of the present invention is not so limited. That is, UIs may be provided and computing resources dynamically allocated as described herein in connection with any of a wide range of web and network-based services and systems. For example, UIs provided as described herein may provide access to home automation services by which users may configure and customize various functionalities in their homes, e.g., security, lighting, atmospheric controls, etc. In another example, UIs provided as described herein may provide access to an enterprise network and/or an enterprise software suite. As should be understood with reference to these diverse examples, the range of services and systems to which UIs may provide access in accordance with the present invention is virtually limitless. The scope of the invention should therefore not be limited by reference to the specific examples described herein.

Figure 2:
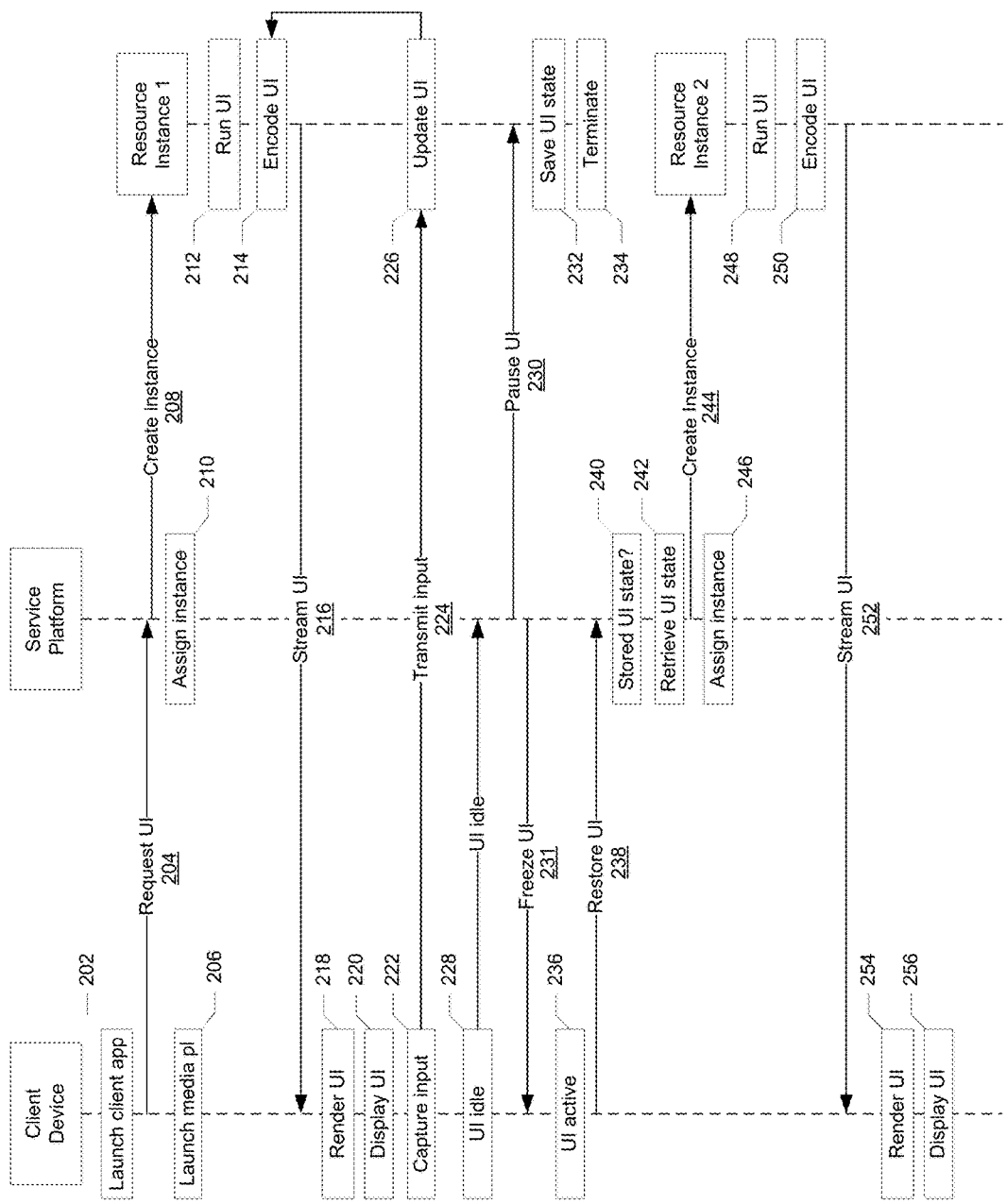
FIG. 2 is a flow diagram illustrating dynamic allocation of computing resources according to a particular implementation.

Referring now to FIG. 2, when a user launches a client app on his device (202), e.g., a content service app such as streaming video app, a connection request is sent to a remote service (204), e.g., content service 102, and a media player is launched on the client device (206). The service creates or requests creation of an instance of a computing resource (208) (e.g., with UI logic 110), and assigns the instance to the requesting client app (210). The computing resource instance may be, for example, a virtual server operating on the same platform as the service or on a separate platform, e.g., computing platform 114.

According to a particular class of implementations, the computing resource instance is a specialized virtual server optimized for processing intensive applications such as, for example, HD video streaming, game streaming, 3D application streaming, and other server-side graphics workloads. The virtual server instance employs one or more high performance processor(s), a sophisticated graphics processing unit (GPU), and a specialized hardware video encoder to generate a high quality video representation of the UI (not shown). According to a particular implementation, the computing resource instance is an Elastic Compute Cloud (EC2) G2 server instance provided by Amazon Web Services that employs a GRID GPU from NVIDIA that, in turn, employs an H.264 video encoder. However, it will be noted that a wide variety of computing resource types and streaming video hardware and software solutions may be employed without departing from the scope of the invention. For example, other video codecs such as H.265 and WebM might be employed for particular implementations. The diversity of other variations that might be employed will be apparent to this of skill in the art.

The newly created instance begins execution of the service UI (212), encodes the UI as a video stream (214), and begins streaming the UI to the requesting client app on the client device (216). The client app renders the video to the device's media player (218) which then displays the UI on the display of the device (220). The user is able to interact with the streaming UI (e.g., discovering and selecting videos for playback) using the various user interfaces of the client device just as if the UI was being executed on the client device. To enable this, the client app captures the user's interactions with the UI (222) and transmits this input back to the assigned computing resource (224) so that they may be used to update the state of the UI being streamed to the client (226).

According to a particular implementation, the client app on the client device is a thin client that performs two important functions; (1) it renders the video received from the assigned computing resource for display by the device's media player; and (2) it captures user input (e.g., mouse clicks, keystrokes, stylus events, and display touch events such as touches, taps, swipes, drags, pinches, etc.) for transmission to the UI operating on the remote computing resource. Such an approach may be characterized by some significant advantages. For example, this approach enables a service accessed by the UI to be made available to new types of client platforms much more quickly and at a much lower cost than the conventional approach in which a much larger and more complicated custom application would otherwise need to be created and deployed for each type of platform. Instead, the same or a very similar UI may be used for a variety of different device types while only a thin client needs to be developed and deployed for each platform type. Moreover, because the service may be deployed with a thin client, ongoing access to the service by the user may be achieved more quickly than with a larger custom application; both in terms of the time to download the client app to the client device, as well as each time the user launches the client app.

Implementations as described herein may also provide a UI experience that is otherwise beyond the capability of older, legacy platforms. That is, the processing power and sophistication of the processors and GPUs with which UIs are generated according to some implementations may far exceed the processing capabilities of many older devices. And because the UIs are being rendered by this very powerful hardware in the cloud and streamed to the client as video rather than being rendered locally by the relatively weak legacy hardware, the user experience of the UI (e.g., in terms of latency, fluidity, graphics, etc.) is limited by the video rendering capabilities of the device rather than its outmoded processing capabilities.

Referring back to FIG. 2, when the user navigates away from the UI or the UI otherwise becomes idle (228), this is detected by the service which then sends a notification to the computing resource instance or the service that the operation of the UI should be paused (230). For example, the server might detect that the user has switched to another application on the client device. In another example, the service might detect that there has been no user interaction with the UI for a period of time. In yet another example, in which the UI provides access to a streaming video service, the server might detect that the user initiated playback of a selected video. In still another example, the service being accessed via the UI might include advertising in the form of streaming video. In such a case, presentation of advertising content (e.g., by the service or an advertising platform) may be a situation in which the UI might be considered to be idle.

More generally, a wide variety of user actions and client device states indicating that a UI is likely going unused may be used to trigger the notification or determination that the UI should be paused. The way in which the need to pause the UI is detected may also vary. As discussed above, the UI being idle might be detected by the service. Alternatively, the client app could detect this condition and send a notification to either the server or the assigned computing instance. In another alternative, the UI being idle might be detected by the assigned computing instance, e.g., by lack of user input.

According to a particular implementation, the server may instruct the client app or the media player to freeze the current frame of the UI (231). This avoids the situation in which the display on the client device goes black when operation of the assigned computing instance terminates. However, it will be understood that this may not be necessary. For example, in the situation where the user has navigated away from the UI, the visual representation of the last frame of the UI might not need to be persisted on the client device. In another example in which the restored state of the UI is not identical to the last state of the UI, this step may not be necessary.

For implementations in the context of a content service, the media player with which content is rendered may be the same media player with which the UI is rendered and displayed. Such an approach may provide a user experience in which the transition from the UI to playback of the content, and back, is seamless. However, it should be noted that implementations are contemplated in which the UI and the service delivered in the context of such an implementation may be rendered with separate mechanisms.

In response to the notification that operation of the UI should be paused, the state of the UI is serialized and preserved using an appropriate persistence mechanism associated with the service (232), e.g., data store 112. Operation of the computing resource instance is then terminated (234). Serialization of the UI state may be done by the assigned computing resource instance that is executing the UI or some associated process, e.g., UI logic 110. The serialized information includes identifying information that enables the persisted UI state to be later restored as if it were part of the same computing session. Such identifying information might include, for example, an identifier of the client device (e.g., an IP address, a MAC address, a cookie, etc.) so that, when a subsequent request is received from that same device, the UI can be restored. As will be understood, the nature of the serialized information is highly dependent on the particular of the implementation. Those of skill in the art will understand for particular implementations what needs to be preserved to enable restoration of the UI at or near the point at which the user stopped interacting with it.

In addition or alternatively, the identifying information might include user and/or account information so that a subsequent request associated with that user or account would result in restoration of the UI. This would allow for the possibility that the subsequent request might come from a different client device associated with that user and/or account. For example, a user might initially interact with the UI on his smart phone but then switch to his tablet to access the same service. In this example, the current state of the UI on the smart phone could be persisted for restoration of the same or an equivalent UI on the tablet enabling a relatively seamless transition of the service from one device to another.

When the user navigates back to the UI or the UI otherwise becomes active (236), e.g., by the user pausing or stopping playback of a video, or attempting to interact with a freezed frame of the UI, or the completion of a video advertisement, the client app sends an indication of this event to the service to restore the UI (238). The service determines that the received indication corresponds to a stored UI state (240), e.g., using the client device identifier or user/account information, retrieves the stored state (242), creates or requests creation of a new instance of the computing resource (244), and assigns the instance to the requesting client app (246). The new instance begins execution of the UI with reference to the retrieved UI state (248), encodes the UI as a video stream (250), and begins streaming the UI to the requesting client app on the client device (252). The client app renders the video to the device's media player (254) which then displays the UI on the display of the device (256). In this way, the UI is restored to a state that is at or near the state last presented to the user. In some cases, the latency associated with the restoration of the UI may be largely imperceptible to the user. In other cases, a message may be presented on the client device (e.g., by the client app in the media player) that the UI session is being restored. In either case, the dynamic allocation of computing resources that enables presentation of the UI is largely transparent to the user.

According to some implementations, the state of the UI that is persisted or the state of the UI that is restored need not be identical to the state of the UI last presented on the client device. For example, the UI might have a hierarchical structure through which the user navigates, e.g., to discover videos in particular categories or sub-categories. When the user navigates away from a particular state of the UI, e.g., by selecting a video for playback, it may not be desirable to later restore the UI to the exact same state, e.g., the UI state in which the user selected the video for playback. That is, the user might not want the exact same set of UI options previously provided. For example, the user might want a UI view in which resuming playback of the video is an option. Alternatively, it might be more advantageous to restore the UI to a state associated with a different level of the UI hierarchy. For example, if the UI has been idle for a very long period of time, it might be advantageous to restore the state of the UI back to an initial or home page. Thus, it should be understood that the restored UI state may differ from the state of the UI last presented to the user.

According to various implementations of the present invention, the user experience associated with a UI operating on a remote platform may be maintained substantially as if the UI were executing on the user's client device. And through dynamic allocation of the computing resources required to stream the UI to the client's device, such an approach is made practicable even for applications in which there may be long periods of time during which the UI is idle. This is particularly the case for video services in which the time associated with video playback may be significantly greater than the time during which the user engages with the UI.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising one or more computing devices configured to:
    allocate a first virtual server from a shared resource pool for execution of a user interface;
    execute the user interface using the first virtual server;
    with the first virtual server, generate a first video representation of the user interface;
    stream the first video representation of the user interface from the first virtual server to a first remote client device via a network, wherein the first video representation of the user interface is compatible with rendering capabilities of the first remote client device, and wherein execution of the user interface is incompatible with processing capabilities of the first remote client device;
    receive a first indication from the first remote client device via the network that operation of the user interface should be paused;
    store a state of the user interface in response to the first indication that operation of the user interface should be paused;
    terminate execution of the user interface by the first virtual server;
    return the first virtual server to the shared resource pool;
    receive a second indication via the network that operation of the user interface should recommence;
    allocate a second virtual server from the shared resource pool for execution of the user interface in response to the second indication that operation of the user interface should recommence, the second virtual server being different from the first virtual server;
    execute the user interface using the second virtual server; and
    with the second virtual server, generate a second video representation of the user interface, wherein the second video representation of the user interface reflects the stored state of the user interface.

2. The system of claim 1, wherein the one or more computing devices are further configured to stream the second video representation of the user interface from the second virtual server to the first remote client device via the network.

3. The system of claim 1, wherein the second indication that operation of the user interface should recommence is received from a second remote client device, and wherein the one or more computing devices are further configured to stream the second video representation of the user interface from the second virtual server to the second remote client device via the network.

4. The system of claim 1, wherein the first remote client device is one of a mobile device, a cell phone, a smart phone, a tablet, a personal computer, a laptop computer, a desktop computer, a set top box, a smart television, a gaming console, or a wearable computing device.

5. The system of claim 1, wherein the user interface is configured to enable one or more of discovery of content, playback of content, configuration of a home automation service, control of a home automation service, access to an enterprise network, or access to an enterprise software suite.

6. The system of claim 1, wherein the one or more computing devices are configured to allocate the first and second virtual servers by creating first and second instances of virtual computing resources.

7. The system of claim 6, wherein the first and second instances of the virtual computing resources employ graphics processing units to encode the first and second video representations of the user interface.

8. The system of claim 1, wherein the user interface enables discovery and selection of content, wherein the indication that operation of the user interface should be paused is generated in response to initiation of playback of first content, and wherein the indication that operation of the user interface should recommence is generated in response to pausing or termination of playback of the first content.

9. The system of claim 8, wherein the first content is streamed to the first remote client device from a content delivery network that is distinct from the system.

10. The system of claim 1, wherein the second video representation of the user interface begins with a representation of the stored state of the user interface such that the first and second video representations of the user interface appear to be part of a single interactive session.

11. The system of claim 1, wherein the one or more computing devices are configured to allocate the first virtual server in response to launching of an application on the first remote client device.

12. The system of claim 1, wherein the user interface enables discovery and selection of content, and wherein the first video representation of the user interface is streamed to a media player on the first remote client device that is also configured for playback of the content.

13. A client device, comprising:
    memory;
    a display; and
    one or more processors configured to:
    launch an application corresponding to a user interface;
    send an indication of the launching of the application to a remote platform;
    receive a first video stream of a first video representation of the user interface from a first virtual server from a shared resource pool of the remote platform, the user interface executing on the first virtual server, wherein the first video representation of the user interface is compatible with rendering capabilities of the client device, and wherein execution of the user interface is incompatible with processing capabilities of the client device;
    render the first video representation for presentation on the display of the client device;
    after operation of the user interface has been paused, transmit an indication to the remote platform that operation of the user interface should recommence;
    receive a second video stream of a second video representation of the user interface from a second virtual server from the shared resource pool of the remote platform, the user interface executing on the second virtual server, the second virtual server being different from the first virtual server, the second video representation reflecting a state of the user interface associated with the first video representation; and
    render the second video representation for presentation on the display of the client device.

14. The client device of claim 13, wherein the user interface is configured to enable one or more of discovery of content, playback of content, configuration of a home automation service, control of a home automation service, access to an enterprise network, or access to an enterprise software suite.

15. The client device of claim 14, wherein the one or more processors are configured to:
- render the first and second video representations of the user interface in conjunction with a media player on the client device that is also configured for playback of first content;
- generate the indication that operation of the user interface should be paused in response to initiation of playback of the first content; and
- generate the indication that operation of the user interface should recommence in response to pausing or termination of playback of the first content.

16. The client device of claim 15, wherein the one or more processors are further configured to receive a content stream corresponding to the first content from a content delivery network that is distinct from the remote platform.

17. The client device of claim 13, wherein the one or more processors are configured to render the second video representation of the user interface beginning with a representation of the state of the user interface associated with the first video representation such that the first and second video representations of the user interface appear to be part of a single interactive session.

18. The client device of claim 13, wherein the client device is one of a mobile device, a cell phone, a smart phone, a tablet, a personal computer, a laptop computer, a desktop computer, a set top box, a smart television, a gaming console, or a wearable computing device.

19. A computer program product, comprising one or more non-transitory computer-readable media having computer program instructions stored therein, the computer program instructions being configured such that, when executed by one or more computing devices, the computer program instructions cause the one or more computing device to:
- allocate a first virtual server from a shared resource pool for execution of a user interface;
- execute the user interface using the first virtual server;
- with the first virtual server, generate a first video representation of the user interface;
- stream the first video representation of the user interface from the first virtual server to a first remote client device via a network, wherein the first video representation of the user interface is compatible with rendering capabilities of the first remote client device, and wherein execution of the user interface is incompatible with processing capabilities of the first remote client device;
- receive a first indication from the first remote client device via the network that operation of the user interface should be paused;
- store a state of the user interface in response to the first indication that operation of the user interface should be paused;
- terminate execution of the user interface by the first virtual server;
- return the first virtual server to the shared resource pool;
- receive a second indication via the network that operation of the user interface should recommence;
- allocate a second virtual server from the shared resource pool for execution of the user interface in response to the second indication that operation of the user interface should recommence, the second virtual server being different from the first virtual server;
- execute the user interface using the second virtual server; and
- with the second virtual server, generate a second video representation of the user interface, wherein the second video representation of the user interface reflects the stored state of the user interface.

20. A computer program product, comprising one or more non-transitory computer-readable media having computer program instructions stored therein, the computer program instructions being configured such that, when executed by a client device, the computer program instructions cause the client device to:
- send an indication of launching of an application to a remote platform;
- receive a first video stream of a first video representation of a user interface from a first virtual server from a shared resource pool of the remote platform, the user interface executing on the first virtual server, wherein the first video representation of the user interface is compatible with rendering capabilities of the client device, and wherein execution of the user interface is incompatible with processing capabilities of the client device;
- render the first video representation for presentation on a display of the client device;
- after operation of the user interface has been paused, transmit an indication to the remote platform that operation of the user interface should recommence;
- receive a second video stream of a second video representation of the user interface from a second virtual server from the shared resource pool of the remote platform, the user interface executing on the second virtual server, the second virtual server being different from the first virtual server, the second video representation reflecting a state of the user interface associated with the first video representation; and
- render the second video representation for presentation on the display of the client device.

* * * * *